United States Patent [19]
Roark

[11] 3,833,934
[45] Sept. 3, 1974

[54] RADAR DATA RECORDING AND REPLAY SYSTEM

[75] Inventor: Michael A. Roark, Leland, Miss.

[73] Assignee: BKR, Inc., Greenville, Miss.

[22] Filed: May 9, 1972

[21] Appl. No.: 251,717

[52] U.S. Cl. .............................. 343/5 PC, 35/10.4
[51] Int. Cl. ........................... G01s 7/30, G01s 9/02
[58] Field of Search ............. 35/10.4; 343/5 PC, 6 R

[56] References Cited
UNITED STATES PATENTS

| | | | |
|---|---|---|---|
| 3,444,553 | 5/1969 | Tsumura et al. | 35/10.4 X |
| 3,634,887 | 1/1972 | Buchholz | 343/5 PC |

Primary Examiner—Malcolm F. Hubler
Attorney, Agent, or Firm—Clarence A. O'Brien; Harvey B. Jacobson

[57] ABSTRACT

A radar data recording and playback system comprising a recording adapter circuit for processing output signals from a radar apparatus for recording such on separate channels of a video tape recording apparatus, and a playback adapter circuit for processing the recorded radar data signals into proper form for operation of a radar visual display device. The adapters may also include means for processing heading signals and auxiliary inputs, such as audio signals, for recording such on a separate channel or track of the recording apparatus.

19 Claims, 10 Drawing Figures

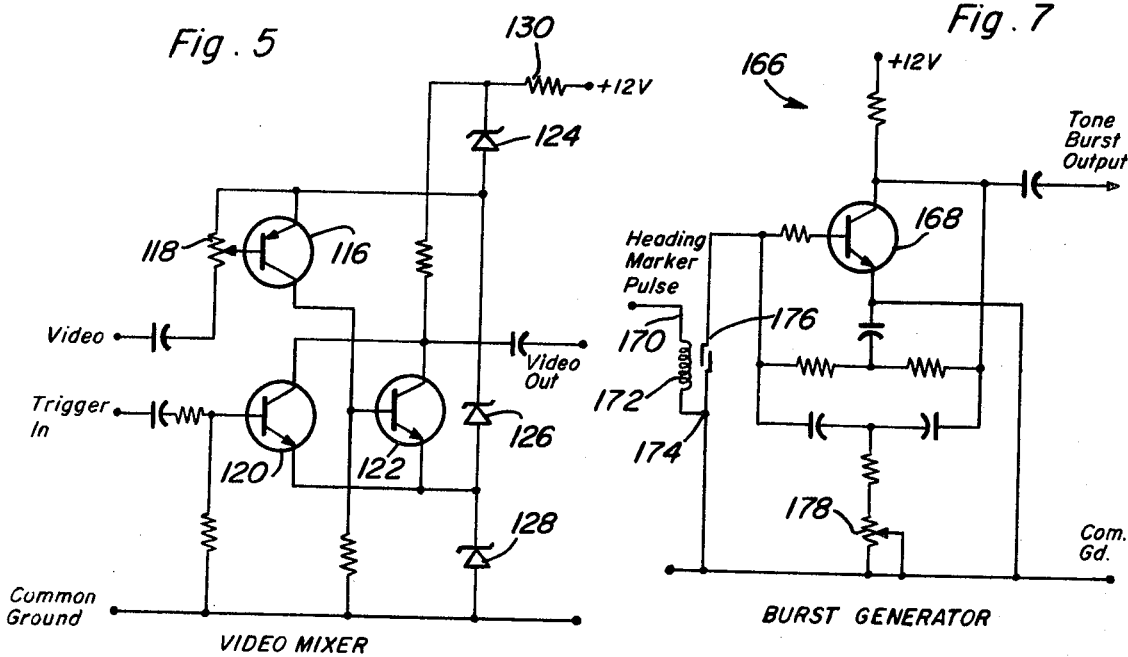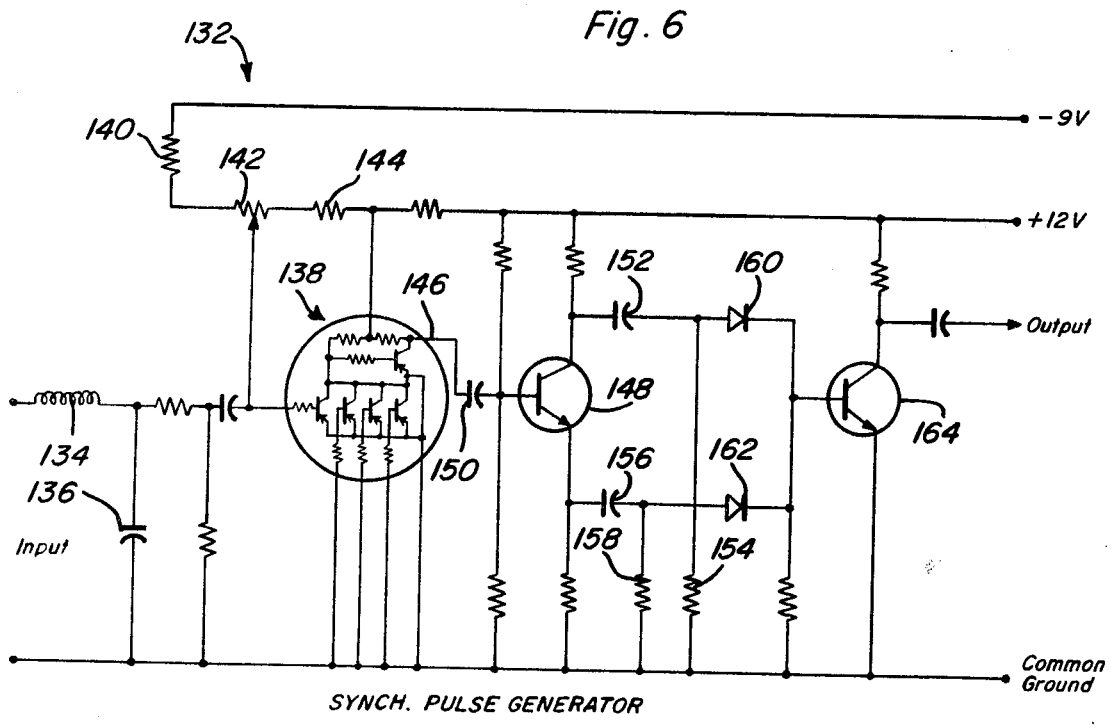

TRIGGER PULSE GENERATOR

BEARING GENERATOR

RADAR DATA RECORDING AND REPLAY SYSTEM

The present invention is generally related to radar systems and, more particularly, to a radar data recording system which may utilize a conventional magnetic video tape recording device to provide replay by way of conventional radar visual display devices.

In recent years, the great increase in air and nautical transportation and the accidents or hazardous conditions related thereto, have created an urgent need for a dependable radar data recording system. Such a system should provide a permanent record of the movements of a ship or plane and its relation to obstacles and the like within the range of its radar system. Therefore, in the event of an accident, the recorded data could subsequently be replayed for study or investigation. While various radar data recording systems have been recently proposed, such have, for the most part, proven unacceptable primarily due to their complexity, bulk, and great expense.

Therefore, it is an object of the present invention to provide a radar data recording and replay system including record and replay adapters which are relatively simple in overall construction, are compact, and which may be installed for use with an existing radar system and which are relatively inexpensive to manufacture and maintain.

Another object of the present invention is to provide an improved radar data record and replay system which may utilize existing radar apparatus and visual display devices and includes means for adapting the radar data signals for recording and replay by way of a multi-channel video tape recording apparatus.

It is a further object of the present invention to provide a novel radar data recording and replay system including record and replay adapters which process and/or combine signals from the radar apparatus for recording on a video tape recording apparatus, the recorded signals being processed during replay for operation of a radar visual display device.

Still another object of the present invention is to provide a unique radar data recording adapter including means for mixing video and trigger signals from an existing radar apparatus for recording such on a single track of an associated video recording apparatus.

It is another object of the present invention to provide a radar data recording adapter including means for mixing heading signals with auxiliary input signals for recording on a single track of the associated video recording apparatus.

Still a further object of the present invention is to provide a radar data replay adapter including means for handling the above-mentioned recorded signals from each track and processing such into proper forms comparable to the original radar apparatus output signals, whereby the processed signals are effective to operate a radar visual display device to reproduce the original radar data.

These together with other objects and advantages which will become subsequently apparent reside in the details of construction and operation as more fully hereinafter described and claimed, reference being had to the accompanying drawings forming a part thereof, wherein like numerals refer to like parts throughout.

FIG. 5 is a schematic diagram of the preferred embodiment of the video mixer circuit associated with the present invention.

FIG. 6 is a schematic diagram of the preferred embodiment of a synch. pulse generator associated with the present invention.

FIG. 7 is a schematic diagram of the preferred embodiment of the heading marker burst generator associated with the present invention.

The above mentioned objects of the present invention are achieved by converting electrical signals from a radar apparatus into suitable form to be recorded on a three-track tape deck, one track of which has wide band characteristics for recording video type information. The equipment provided for this purpose is hereinafter referred to as the "record adapter," and in practice is mounted to the video tape deck. For display of the recorded radar data, signals from the tape deck are converted back into their original forms by a unit hereinafter referred to as the "playback adapter," which, preferably, is also mounted to the tape deck. The output signals from the playback adapter are utilized to operate a visual display device, such as that normally associated with the transmitter-receiver unit of a radar installation.

The output signals from the playback adapter contain all of the information necessary to reconstruct accurately the original Plan Position Indicator (PPI) display, complete with range and heading markers, if desired. Two additional channels are provided, one of which handles audio signals and the other of which accommodates any desired control function or data which may be converted to digital form, such as time signals.

By providing relays, switches, or similar means with an existing radar installation, the radar data signals may be easily recorded for subsequent playback or an "instant replay" for study or investigation. Preferably, the system of the present invention may be utilized for marine applications, whereby the recorded data is available for research or investigation of accidents or other hazardous situations or conditions occurring along our waterways. In addition, the radar data recording and replay system may be utilized for air traffic, or at airports in conjunction with approach control radar, or at weather stations for detailed study and forecast of weather conditions.

Of course, it is not intended that this invention be limited to a three-track video recording apparatus or to the adapter circuitry as illustrated herein. It is foreseeable that any number of recording tracks or channels may be provided dependent upon the amount and type of information to be recorded. Modification of the components or circuitry herein disclosed is deemed to fall within the scope of the present invention.

Figure 1:
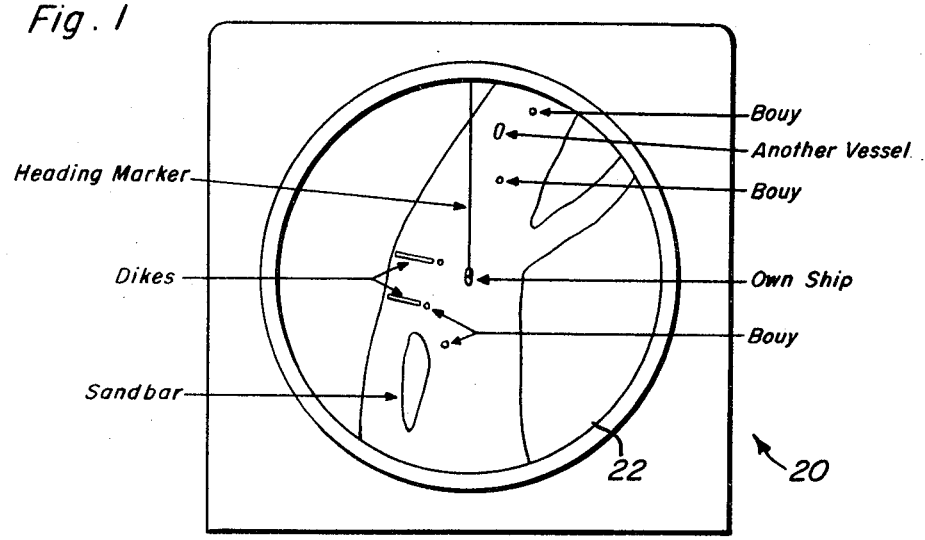
FIG. 1 is a diagrammatic illustration of a typical Plan Position Indicator type of radar visual display device associated with the present invention.

Referring now, more particularly, to FIG. 1 of the drawings, a typical radar visual display device is generally indicated by the numeral 20 and includes a conventional CRT screen 22 which displays the appropriate radar data. In a marine application, such radar data would include echo signals from buoys, other vessels, and land masses within the vicinity. In addition, directional orientation may be provided by way of a heading marker. In order to provide such a PPI display from a recording, the following data must be recorded:

1. Video signals representing target echoes.
2. Bearing signals or information representative of the direction of the target echoes.

In order that the resulting playback of the recorded data be more accurate and versatile, the following data is also provided:

1. Trigger pulses to activate the display sweep generator and range marker circuits to time reception of the echoes and progression of the sweep.
2. Heading signals representative of the craft's heading relative to the display.

In addition, to further increase the versatility of the overall system in general, the following channels have been provided for:

1. An audio channel to monitor radio telephone communications, or the like.
2. An auxiliary control or data channel.

Figure 2:
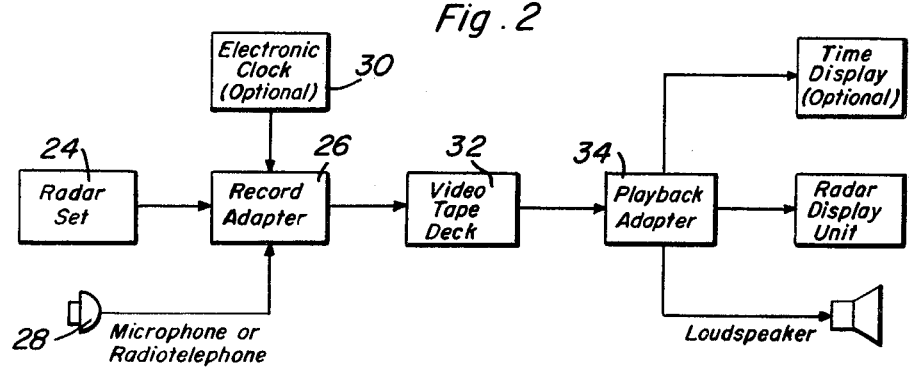
FIG. 2 is a simplified block diagram of the radar data recording and replay system of the present invention.

With reference to FIG. 2 of the drawings, it will be observed that the overall system is provided with a radar set or apparatus 24, preferably, of a conventional type which provides radar data signals to the record adapter 26, as hereinafter explained. In addition, audio signals may be provided from a microphone or radio telephone 28 and fed to the record adapter. If desired, time data may be provided from and electronic clock 30, or the like. Output signals from the record adapter are fed to a video recording apparatus 32, such as that presently marketed under the trade name of Panasonic intended for consumer use in television recording. Upon playback, output signals from the video recording apparatus are fed to the playback adapter 34, which processes the signals to provide the appropriate time, radar display, and audio signals corresponding to the input signals fed to the record adapter.

Figure 3:
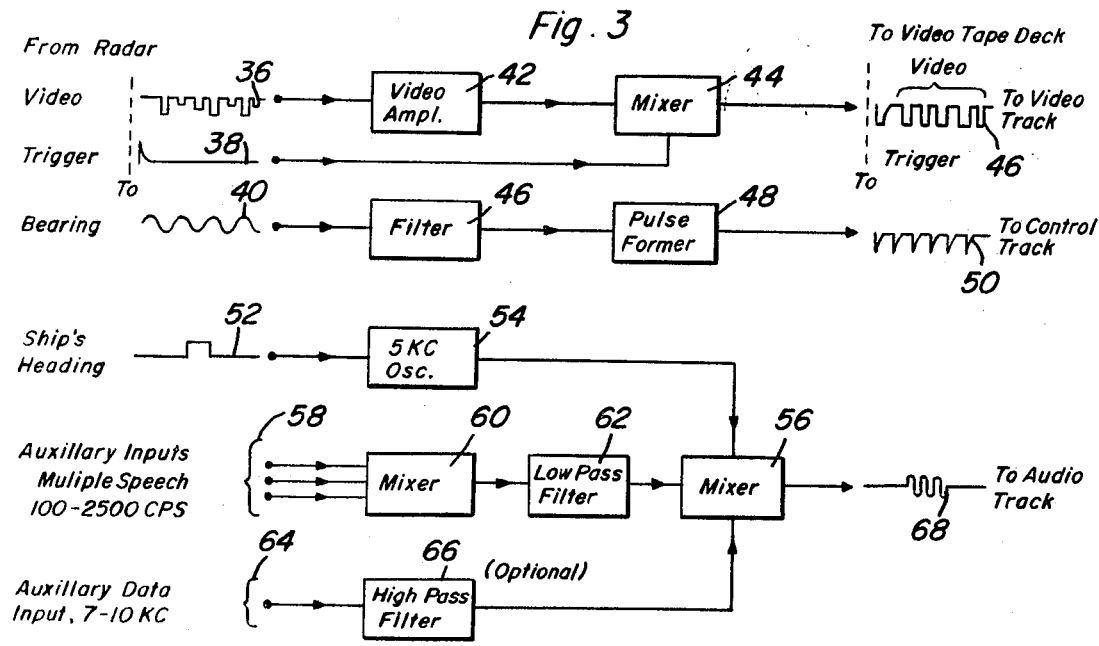
FIG. 3 is a block diagram of the record adapter associated with the present invention.

With reference to FIG. 3 of the drawings, operation of the record adapter may be more fully appreciated. Video signals 36, trigger signals 38, and bearing signals 40 are received from the appropriate radar apparatus outputs and fed to the record adapter for processing prior to recording on a pair of separate tracks associated with the video recording apparatus. The video output signals are comprised of groups of negative pulses, each group immediately following a corresponding radar transmission, with each pulse representing a particular target echo as is the case with most conventional radar systems. The trigger signal 38 is comprised of a series of positive pulses, each occurring simultaneously with or immediately before each radar transmission. The bearing signal 40 is comprised of a portion of the output of a two-phase generator driven by the rotating radar antenna, and preferably is in the form of a sine wave signal. The wave forms illustrated are those typical of signal outputs of a radar apparatus marketed under the trade name of Decca, Model T-219. When utilizing this system the sine wave bearing signal is approximately 74 volts RMS, at 30 Hz, and is a frequency sample taken from either phase of the two-phase generator.

The video pulses 36 are inverted by a video amplifier 42, after which they are of the same amplitude and polarity as the incoming trigger pulses 38. The trigger and video signals are combined in a mixer 44 and inverted to provide a combined video and trigger signal 46 which is fed to one of the tracks associated with the video recording apparatus. It will be appreciated that the trigger and video signals never occur simultaneously, each trigger pulse initiating operations in the radar apparatus which later produce the train of video pulses.

Preferably, the video recording apparatus is provided with three separate channels including a wide-band video channel utilizing two rotating heads, a control channel to synchronize head rotations, and an audio channel with a frequency range of 100 Hz. – 10 KHz. These channels are recorded on three tracks of magnetic tape. The control section of the video recording apparatus is synchronized to the frequency of the radar bearing signal from the record adapter. The bearing signal is fed through a filter 46, preferably 30 Hz., to a pulse former circuit 48, to provide an output signal 50 which is of twice the frequency of the input sine wave. This signal synchronizes the recorder control circuit with the bearing signal.

A heading signal 52 is provided in the form of a pulse which is fed to an oscillator 54, preferably 5 KHz., whereby the oscillator is enabled during the time interval of the positive segment of the pulse wave form. This produces an audio frequency burst for each input pulse which is fed to a mixer circuit 56. In addition, several audio input signals 58 are combined by a conventional audio mixer 60, the output of which is fed to a low pass filter 62, which attentuates all frequency above the range necessary for acceptable speech reproduction. An auxiliary data input signal 65 is fed through an optional high-pass filter 66 which attenuates signals within the frequency range of the other two audio track channels. The heading marker burst, audio speech signals, and auxiliary data signals are combined in the conventional audio mixer 56 which provides an audio signal 68 which is fed to the audio track of the video recording apparatus.

Figure 4:
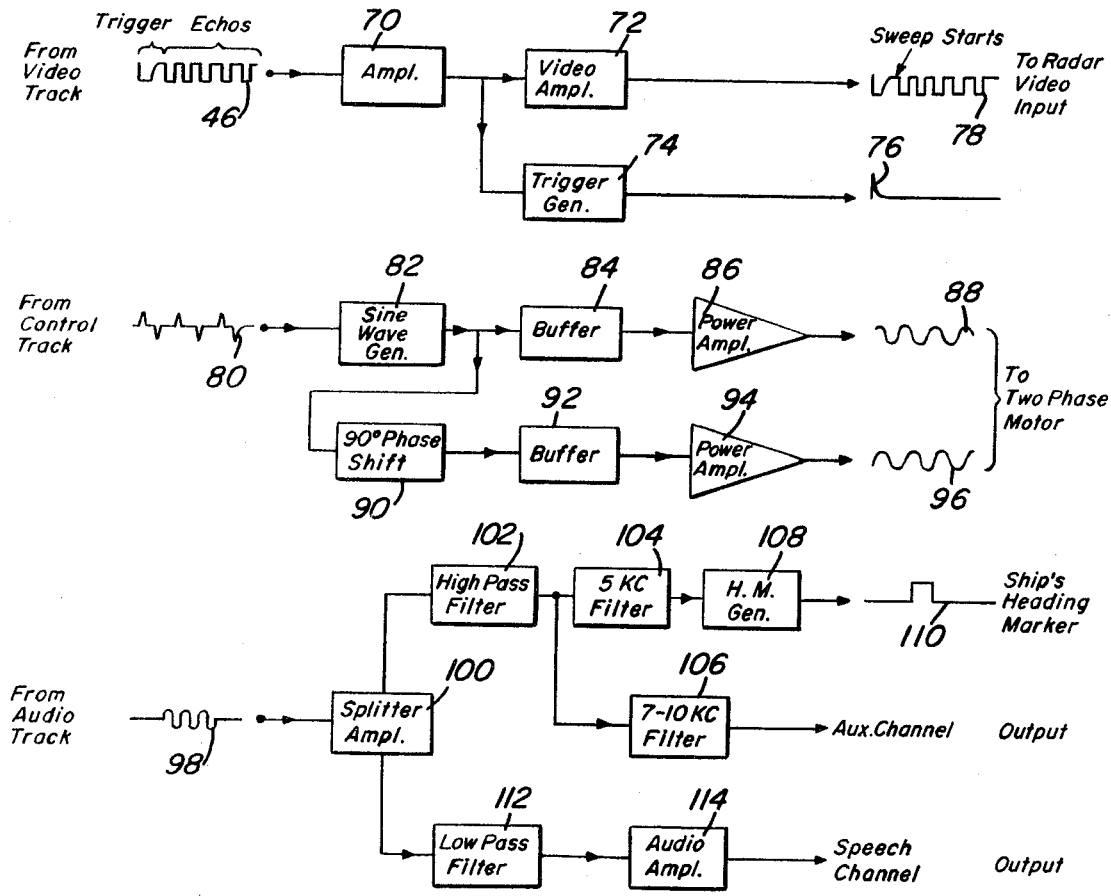
FIG. 4 is a block diagram of the replay adapter associated with the present invention.

Referring now, more particularly, to FIG. 4 of the drawings, the operation of the playback adapter associated with the present invention may be more fully appreciated. The playback adapter is comprised of three independent circuits for processing the signals from the video, control, and audio tracks, respectively. As described above, the signal recorded on the video track is comprised of a group of pulses, each group starting with a trigger pulse follosed by a series of echo pulses. This composite trigger and echo signal is fed through an amplifier 70 and video amplifier 72 to the video input of the associated radar visual display device. It will be appreciated that the trigger pulse is not seen on the screen of the display device since the sweep does not start until some definite time after the trigger pulse, as controlled by a delay line in the radar display device. The leading edge of each group of the composite signals is effective to fire a trigger generator 74 which generates a single pulse 76 comparable to the trigger pulse output of the radar apparatus. The output of video amplifier 72 is comprised of a wave form 78 made up of pulses of the same width and spacing as those of the radar apparatus video output signals 36, with the exception that the pulses are of equal magnitude.

Control pulses 80 are provided from the control track or channel during replay. These pulses are fed through a sine wave generator 82 and a buffer amplifier 84 to a power amplifier 86 to provide a sine wave output signal 88 comparable to bearing signal 40. In addition, a portion of the output from the sine wave generator is fed to a 90° phase delay circuit 90 and through a buffer 92 to a power amplifier 94 to provide a second sine wave output signal 96 which is 90° out of phase with signal 88. These sine wave output signals are fed to a two-phase motor in the radar display device, whereby the speed of the motor is determined by the frequency of the control signal 80 recorded on the recording apparatus control track.

The third channel of the recording apparatus provides an audio output signal, such as that illustrated at 98, which is fed to a splitter amplifier 100. A portion of the signal is fed to a high-pass filter 102 and is separated between a 5 KC filter 104 and 7–10 KC filter 106. The output of the 5 KC filter is fed to a pulse generator 108 which provides an output signal 110 comparable to the heading signal 52 originally fed to the recording apparatus. The output from filter 106 provides the above mentioned auxiliary data. A second portion of the signal from splitter amplifier 100 is fed through a low-pass filter 112 to an audio amplifier 114 to provide the above mentioned audio output signals corresponding to those originally fed to the recording apparatus.

Referring now, more particularly, to FIG. 5 of the drawings, a schematic diagram of a suitable video circuit for the record adapter is illustrated. Briefly described, the circuit is provided with a transistor 116 which serves as an amplifier and inverts the video input signal, the gain being controlled by a variable resistance 118. A pair of transistors 120 and 122 together form the above mentioned mixer which combines the positive output of transistor 116 with the incoming positive trigger pulses. Preferably, transistors 120 and 122 are biased well into cutoff with no signal input and are fully saturated with a typical input pulse. This provides a constant amplitude output, as illustrated by wave form 46 of FIG. 3. This prevents receiver background noise, ringing, or slow decay at the trigger input from appearing in the output signal. The circuit is further provided with Zener diodes 124, 126, and 128, which together with a resistor 130 form a regulated voltage divider to provide proper bias voltages. The negative video pulses are inverted twice, while the positive trigger pulses are inverted only once. This provides a composite output signal consisting of negative pulses.

With reference to FIG. 6, the schematic diagram of the preferred embodiment of the control pulse generator portion of the record adapter is generally indicated by the numeral 132 and includes an input choke 134 and capacitor 136, which together form a low-pass filter to remove any high frequency irregularities in the input wave form which could cause erratic triggering. The filtered input signal is impressed upon an integrated circuit gate generally indicated by the numeral 138 which provides a sine-to-square wave converter. A group of serially connected resistors 140, 142, and 144 provide an adjustable bias network which serves to correct any unsymmetrical condition of the input wave form. The square wave output of integrated circuit 138 is provided through line 146 which is connected to a 180° phase splitter 148 by way of capacitor 150. Each output of the phase splitter is differentiated by networks comprised of capacitor 152 and resistor 154, and capacitor 156 and resistor 158. The resulting output pulses are fed through diodes 160 and 162, which provide positive pulses to transistor 164, where they are amplified and inverted. It will be appreciated that the output pulse repetition rate will be twice the frequency of the input signal since these pulses synchronize a multi-vibrator within the video recording apparatus. Since the multi-vibrator inherently divides by two, the operating frequency will be the same as that of the input signal to the record adapter.

Referring to FIG. 7, the schematic diagram of the preferred embodiment of the heading marker burst generator is generally indicated by the number 166 and, basically, is a twin "T" oscillator designed around a single transistor 168. Preferably, the burst generator operates at 5 KHz. and is switched on only when receiving a heading signal such as pulse 52 illustrated in FIG. 3. The antenna associated with the radar apparatus is connected to a heading marker line 170, normally at −12 volts and including a coil 172 connected to the burst generator at junction 174. The coil is associated with a magnetic read switch 176, or the like, which is closed by current flow through coil 172. It will be appreciated that when the read switch is closed, the oscillator feedback is shorted to ground, thus preventing oscillations. When a heading marker switch, not illustrated, in the scanner is actuated, reed switch 176 is momentarily open allowing transistor 168 to oscillate for the duration of the heading signal pulse. The circuit includes an adjustable resistor 178 which provides fine adjustment of the oscillator frequency. The remaining components of the audio track circuitry comprise conventional audio mixers and filters as illustrated in FIG. 3, and a discussion of such circuitry is deemed unnecessary.

Figure 8:
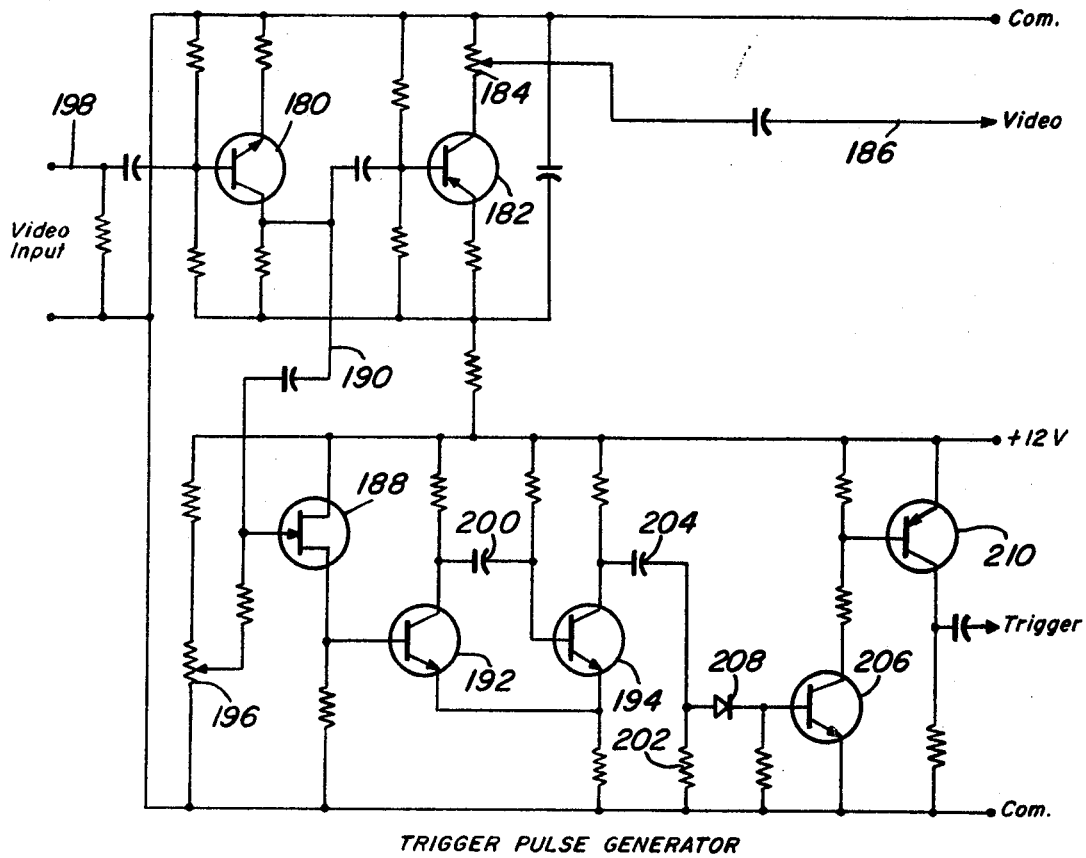
FIG. 8 is a schematic diagram of the preferred embodiment of a trigger pulse generator and video amplifier associated with the present invention.

As explained above, the playback adapter is provided with a suitable video circuit for processing the recorded composite trigger and echo signals to provide separate video input and trigger signals to the radar display device. A schematic diagram of such a video circuit is illustrated in FIG. 8 and basically consists of an amplifier, a video amplifier and trigger pulse generator. A pair of transistors 180 and 182 provide the amplifier and video amplifier, respectively. The output of the video amplifier is fed through a variable resistor 184 to an output line 186 normally connected to the visual display device. By adjusting resistor 184, the amplitude of the video output signal may be selectively controlled. A portion of the output of amplifier transistor 180 is fed to a field effect transistor 188 by way of line 190. In turn, the output of the field effect transistor is coupled to a monostable multi-vibrator defined by a pair of transistors 192 and 194. During operation, transistor 192 is normally in the off mode, with transistor 194 being in the conductive mode. A variable resistor 196 is effective to control the bias on the base of transistor 192 through the field effect transistor 188.

Operation of the trigger pulse generator may be briefly described as follows. Composite video and trigger input signals in the form of pulses are fed to line 198 and amplified through transistor 180. The first negative input pulse from the video channel of the recording apparatus is effective to change the state of the multi-vibrator defined by transistors 192 and 194. The multi-vibrator is held in this state or mode until capacitor 200 between the collector of transistor 192 and base of transistor 194 charges sufficiently to render transistor 194 conductive again. This returns the multi-vibrator circuit to its original state. The time required for the return to the original state permits the remainder of the input pulses to pass through the video amplifier without further affecting the trigger output. When transistor 194 is turned off by the leading input pulse, a positive pulse therefrom is differentiated by resistor 202 and capacitor 204 connected to the collector of transistor 194. The differentiated pulse is then fed to the base of transistor 206 by way of a diode 208. The pulses are amplified by transistor 206 and impressed upon the base of transistor 210 which inverts the pulse and provides an output trigger signal to the video display device, as indicated in the block diagram of FIG. 4. Thus, it will be appreciated that the circuitry associated with the replay adapter is effective to separate the trigger and video echo pulse signals to provide input signals to the video display device which are comparable to the original signals received from the radar apparatus by the record adapter.

Figure 9:
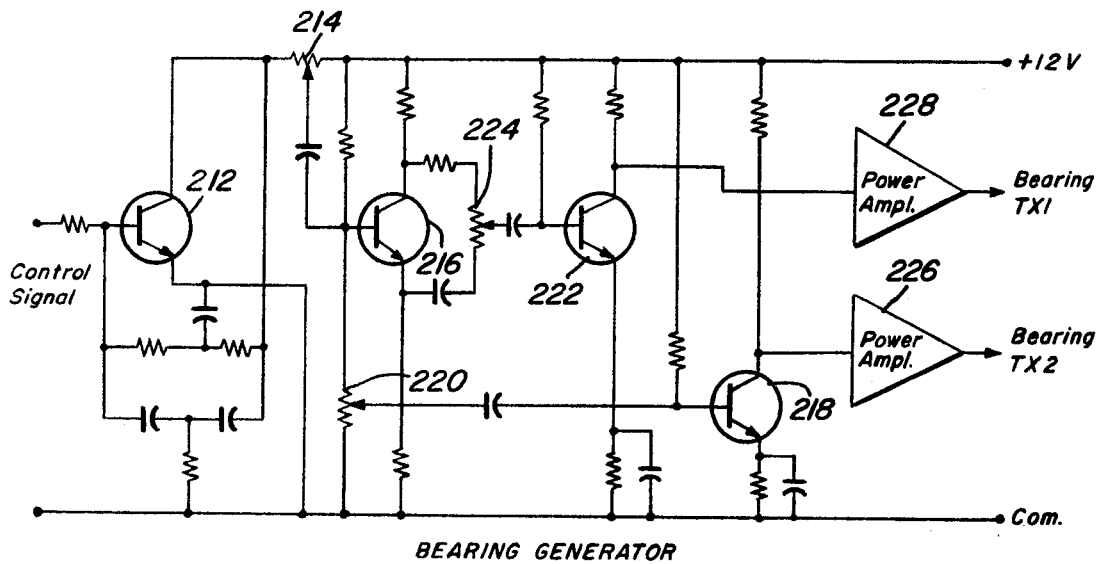
FIG. 9 is a schematic diagram of a preferred embodiment of a bearing motor drive signal generator associated with the present invention.

As mentioned above, the relay adapter is also provided with appropriate circuitry for processing signals recorded on the control track to provide output signals to the visual display device to synchronize the two phase motor of the display device with the original radar bearing signals. FIG. 9 is a schematic diagram of a preferred embodiment of such a bearing motor drive generator circuit. Signals from the control track of the recording apparatus, such as those indicated at 80 in FIG. 4, are fed to a transistor 212 which defines, in part, a twin "T" oscillator adjusted into its quiescent state. Under these conditions, the oscillator acts as a sine wave generator which is effective to convert the input wave form into a quality sine wave. A variable resistor 214 is connected to the output of the sine wave generator and controls the amplitude of the output signal therefrom, which is fed to the base of transistor 216 associated with a 90° phase shifter. In addition, the sine wave generator output signal is impressed upon the base of a buffer transistor 218 by way of variable resistor 220. The 90° shifted output of transistor 216 is brought to the same level as the 0° output by a buffer transistor 222 by way of variable resistor 224. Resistor 224 is effective to set the phase relationship between the two outputs at 90°, resistor 220 being effective to set the 0° output to the same level as the 90° output.

The respective outputs of buffer transistors 218 and 222 are fed to associated power amplifiers 226 and 228, which in turn provide sine wave signals to the two phase motor associated with the visual display device. It will be appreciated that adjustment of variable resistor 214 is effective to set the output voltages of both power amplifiers at the desired level.

Figure 10:
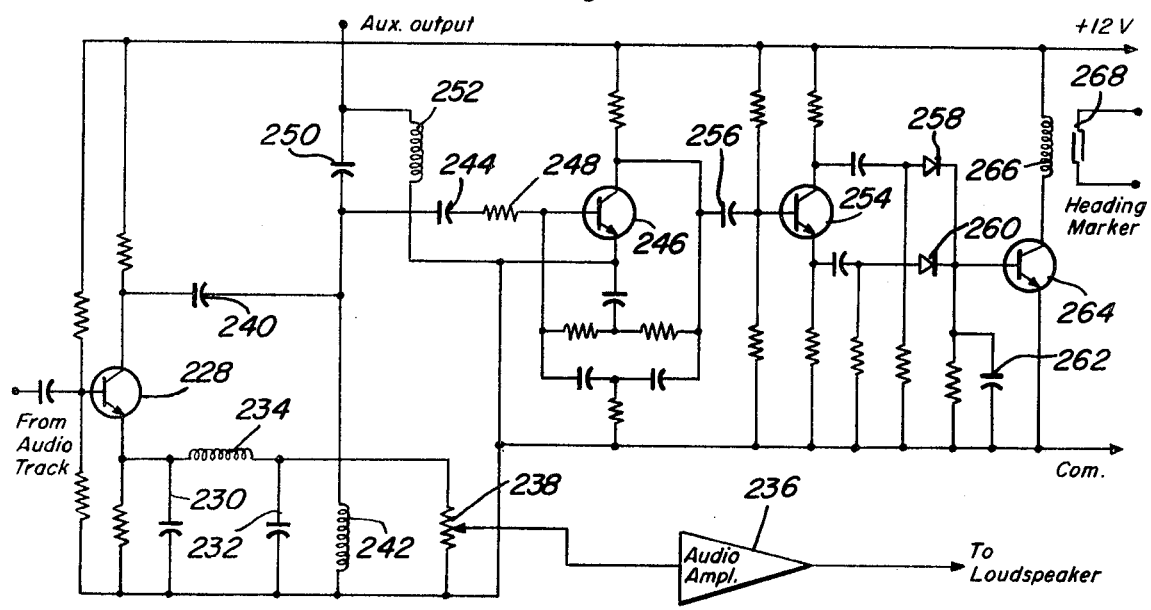
FIG. 10 is a schematic diagram of the preferred embodiment of a playback audio separator and heading marker generator.

As mentioned above, the playback adapter is provided with an audio channel separator circuit which processes the signals recorded on the audio track of the recording apparatus to provide separate signals representative of heading, speech, and auxiliary data. Such a circuit is illustrated in FIG. 10 and includes a transistor 228 which defines a splitter amplifier, whereby a portion of the amplified signal is fed to a low-pass filter connected to the transistor's emitter. Preferably, the low-pass filter is comprised of capacitors 230 and 232, together with an inductance 234. The output of the low-pass filter is fed to an audio amplifier 236 by way of an adjustable output resistor 238. Thus, audio information of less than 5 KC may be fed on a separate output to a loud speaker or similar audio equipment.

The collector of transistor 228 is connected to a high-pass filter defined by a capacitor 240 and inductance 242. The ship's heading signals being set at 5 KC, pass through the high-pass filter and through a capacitor 244 connected to the base of transistor 246 by way of a resistor 248. A capacitor 250 and inductance coil 252 are effective to attenuate passage of the 5 KC heading signal to the auxiliary output. It will be appreciated that transistor 246 defines in part an active filter of the twin "T" type with a sharp response peak at 5 KC.

The output of transistor 246 is impressed upon the base of a phase splitter transistor 254 by way of capacitor 256. The output of transistor 254 is full-wave rectified by a pair of diodes 258 and 260 and is subsequently fed to capacitor 262. Capacitor 262 is charged to a DC level which is effective to turn on a transistor 264, whereby current flows through coil 266 associated with a magnetic reed switch 268. This arrangement provides intermittent closure of the reed switch, thereby producing pulses comparable to the original heading signals. These pulses are fed to the visual display device and provide the appropriate visual marking thereon.

From the foregoing description, it will be appreciated that the radar data recording and replay system of the present invention provides a unique means of utilizing an existing radar system in nearly unaltered form to record video, trigger, and bearing signals from the radar receiving apparatus together with heading signals and auxiliary inputs including audio signals such that all of the signals may be recorded on a conventional three-track video tape recording apparatus. Existing radar systems such as the Decca Model T-219 may be easily combined with the record and playback adapters of the present invention together with a conventional video tape recording apparatus to provide a relatively inexpensive, yet reliable recording and replay system for radar data.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination:
   a. a radar apparatus including means for providing radar video, trigger, and bearing output signals;
   b. means for providing heading signals representative of the heading of the craft associated with said radar apparatus;
   c. a radar visual display device including means for utilizing said video, trigger, and bearing output signals together with said heading signals to provide corresponding visual display data;

d. a recording and playback apparatus including means for recording electrical signals on a plurality of separate channels, and means for selectively replaying said recorded electrical signals from said channels, said channels including a wide band video channel, a control channel, and an auxiliary channel;

e. record adapter means connecting said radar apparatus with said recording means and including means for mixing said video and trigger output signals to provide a composite signal for recording on said video channel, means for processing said bearing signals for recording on said control channel, and means for processing said heading signals for recording on said auxiliary channel;

f. playback adapter means connecting said replay means with said radar display device for (1) processing signals from said video channel to provide separate video and trigger input signals to said display device comparable to said radar apparatus, video and trigger output signals, respectively and (2) for processing signals from said control channel to provide a bearing input signal to said display device comparable to said bearing output signal and (3) for processing signals from said audio channel to provide heading input signals to said visual display device comparable to said original heading signals.

2. The combination of claim 1 wherein said video output signals from said radar apparatus include groups of pulses representative of radar echoes, and a single one of said trigger output signals precedes each group of said video pulses.

3. In combination:
a. a radar apparatus including means for providing radar video, trigger, and bearing output signals;
b. a radar visual display device including means for utilizing said video, trigger, and bearing output signals to provide corresponding visual display data;

c. a recording and playback apparatus including means for recording electrical signals on a plurality of separate channels and means for selectively replaying said recorded electrical signals from said channels;
d. record adapter means connecting said radar apparatus with said recording means and including means for mixing said video and trigger output signals for recording on one of said channels and means for processing said bearing signals for recording on another of said channels;
e. playback adapter means for connecting said replay means with said radar display device for (1) processing signals from said one channel to provide separate video and trigger input signals to said display device comparable to said radar apparatus video and trigger output signals respectively and (2) for processing said signals from said other channel to provide a bearing input signal to said display device comparable to said bearing output signal;
f. said video output signals from said radar apparatus including groups of pulses representative of radar echoes, and a single one of said trigger output signals precedes each group of video pulses; and
g. said record adapter means including means for amplifying said video pulses and clipping such at a predetermined magnitude prior to mixing with said trigger output signals by said mixing means, said video and trigger signals being inverted as necessary and mixed to attain a composite signal of one polarity and uniform amplitude prior to mixing whereby the full dynamic range of the recording channel may be utilized.

4. The combination of claim 1 wherein said means for processing said bearing output signals from said radar apparatus includes means for converting said bearing output signals to pulses as needed to synchronize the control circuit of the recording and playback apparatus.

5. The combination of claim 4 wherein said means for converting said bearing output signals to said pulses phase splits, differentiates and rectifies said bearing output signals and feeds said pulses to said other channel of said recording apparatus.

6. The combination of claim 5 wherein said playback adapter means includes means for processing the recorded bearing signals to provide bearing motor control signals synchronized with said recorded bearing signals.

7. The combination set forth in claim 6 wherein said bearing motor control signals include a pair of separate signals out of phase with each other.

8. For use with a radar apparatus and associated visual display device, in combination:
a. a recording and playback apparatus including means for recording electrical signals on a plurality of separate channels, said channels including a wide-band video channel, a control channel, and an audio channel, and means for selectively replaying the recorded signals from said channels;
b. record adapter circuit means for receiving and processing separate video, trigger, bearing, and heading signals from the radar apparatus and including first means for mixing said video and trigger signals to provide a composite signal which is fed to said video channel, second means for processing said bearing signals and furnishing such processed bearing signals to said control channel, and third means for processing said heading signal and furnishing such processed heading signal to said audio channel;
c. and playback adapter circuit means receiving said composite, bearing, and heading signals from said video, control, and audio channels respectively and including first circuit means for processing said composite signal to provide separate video input and trigger input signals for operating the visual display device, second circuit means for processing signals recorded on said control channel to provide bearing control signals synchronized with the signals recorded on said control channel for operating a synchronization circuit associated with the visual display device, third circuit means for processing the signals recorded on said audio channel to provide an input heading signal to the visual display device comparable to the above mentioned heading signal.

9. The combination of claim 8 wherein said record adapter means includes means for amplifying said video pulses to the same magnitude prior to mixing with said trigger output signals by said mixing means.

10. The combination set forth in claim 8 wherein said bearing control signals include a pair of separate bearing motor control signals 90° out of phase with each other and said synchronization circuit includes a two-phase motor.

11. The combination of claim 8 wherein said means for processing said bearing output signals from said radar apparatus includes means for converting said bearing output signals to pulses as needed to synchronize the control circuit of the recording and playback apparatus.

12. The combination of claim 11 wherein said means for converting said bearing output signals to said pulses phase splits, differentiates and rectifies said bearing output signals and feeds said pulses to said other channel of said recording apparatus.

13. For use with a three-track video tape recording and replay apparatus, a record adapter comprising first means for mixing video and trigger signals to provide a composite signal for recording on a video track, second means for converting radar sine wave bearing signals to pulses for recording on a control track, and third means for converting craft heading pulse signals to sine wave signals for recording on an audio track.

14. The combination of claim 13 wherein said third means includes means for processing speech signals and auxiliary data signals and means for mixing said speech signals and auxiliary data signals with said heading signals to provide a single combined signal for recording on an audio track.

15. The combination set forth in claim 14 wherein said heading pulses are converted to tone bursts of approximately 5KHz, said auxiliary data signals being limited to a frequency range of approximately 7–10KHz, and said speech signals being limited to frequencies of approximately 3KHz, and below.

16. For use with a three-track video tape recording and replay apparatus, a replay adapter comprising first means for processing a composite radar trigger and video signal to provide separate video and trigger signals for operating a radar visual display device, second means for processing a recorded radar bearing control signal to provide bearing motor control signals synchronized with the recorded signals to control a motor associated with a radar visual display device, and third means for processing recorded heading marker signals to provide heading marker pulse signals for operating a radar visual display device.

17. The combination set forth in claim 16 wherein said second means provides a pair of separate bearing motor control signals approximately 90° out of phase with each other and said motor is a two-phase motor associated with a radar visual display device.

18. The combination set forth in claim 16 wherein said third means includes means for separating said heading marker signals from said recorded auxiliary data and speech signals.

19. The combination set forth in claim 18 wherein said heading marker pulse signals are approximately 5KHz, said auxiliary data signals being limited to a range of 7–10KHz, and said speech signals being limited to frequencies of approximately 3KHz and below.

* * * * *